Patented Jan. 3, 1939

2,142,511

UNITED STATES PATENT OFFICE 2,142,511

EGG PRODUCT

Benjamin R. Harris and Marvin C. Reynolds, Chicago, Ill., the First National Bank of Chicago and Lulu E. Reynolds, executors of Marvin C. Reynolds, deceased, assignors to The Emulsol Corporation, Chicago, Ill., a corporation of Illinois No Drawing. Original application January 7, 1936, Serial No. 2,026,631. Divided and this application November 23, 1935, Serial No. 51,271

18 Claims. (Cl. 99—196)

Our invention relates to an improved egg material, together with the use of such a material.

The principal object of our invention is the provision of an egg material having improved properties as an emulsifying agent and general interface modifier.

Another object is the provision of an egg material particularly adapted in the preparation of a cake batter.

Other objects and features of the invention will be apparent from a consideration of the following detailed description.

We have discovered a new and improved egg material having new and improved colloidal and emulsifying properties which render it particularly well adapted as an emulsifying agent in many industries where egg yolk and similar emulsifying agents are customarily used. The material imparts many valuable properties to a cake batter and is particularly well suited for use in this capacity.

Generally speaking, whole mixed eggs contain approximately one-third of yolk and two-thirds of white. The yolk material contains about 50% of moisture and 50% of solids, and the white material contains approximately 12½% of solids, and the rest is moisture. The solid material of whole eggs is composed of various types of proteins having various properties, as well as lecithin material and fats. The white is composed of a complex albuminous substance with traces of sugar of less than ½%. The moisture in the whole egg is partially bound with the solids and is partially in a free state.

On freezing such ordinary mixed eggs and then thawing them out, clumping takes place, and a portion of the liquid oozes out and the egg material is changed in its colloidal properties.

We have discovered that by adding a certain proportion of a hydrophilic lipin, namely, a substance containing a high molecular weight aliphatic lipophile group and also free hydroxyl groups, to the egg material, the colloidal properties of the egg material are altered in that the hydrophilic lipin modifies the surface phenomena of the egg material and produces a product with an increased viscosity and with improved emulsifying value when it is used, for example, in a cake batter emulsion and other edible emulsions.

We have also discovered that if such egg material, with a proportion of our hydrophilic lipin admixed with it, is frozen, and kept in a frozen condition until ready for use, and then thawed out, the thawed product will be more viscous and separation of free moisture will be reduced. In practice, we prefer to use such hydrophilic lipins as are liquid at ordinary temperatures, as it is easier to incorporate them into the egg material. However, we may use hydrophilic lipins of a semi-solid consistency in the form of a paste with water and then add the egg material to the paste by continuous stirring or rubbing or dispersing same by means of a colloid mill or grinding it by means of a paint mill or similar apparatus, to produce a homogeneous dispersion. The liquid emulsion of egg material and hydrophilic lipin may be used after mixing. The product, however, may be frozen and kept in frozen condition below temperatures of decomposition until ready for use, and thawed before using. When the hydrophilic lipin is added to egg white, it is preferable to make a paste by adding the whites to the hydrophilic lipin, gradually. The product may be stirred and agitated considerably as the egg whites do not foam as much in agitation as normally.

The hydrophilic lipins of this invention all contain free hydroxy groups and preferably are fatty acid esters of water soluble hydroxy substances such as glycerols, polyglycerols, sugars, sorbitol, mannitol and other alcohol sugars and hydroxy carboxylic acids. The greater the number of hydroxy groups, the less is required in the egg mixture to produce the desired results.

Examples of the lipins are as follows:

Example 1

100 pounds of fatty acids derived from cottonseed oil are heated with 50 pounds of glycerine with stirring at 220° C. for from two to three hours, preferably in a current of inert gas such as carbon dioxide, until the free fatty acids drop down to about ½% or are completely esterified. This product will be substantially the monofatty acid derivatives of glycerine. The excess of glycerine is drawn off from the product which is in the form of a supernatant layer and the product is further purified if desired.

Example 2

To produce a diglyceride, 125 pounds of the product of Example 1 are heated with 100 pounds of cotton seed oil fatty acids to 240° C. for about two to three hours in the absence of air until the free fatty acids drop to from ½% to 1%.

Example 3

400 pounds of corn oil are heated in an inert atmosphere or in a vacuum under reflux, with 100 pounds of glycerine and 1/10 pound of sodium hydroxide. The temperature is brought up to 250° C. and kept at approximately this temperature for two hours. The mixture is allowed to stand in order to cool and to permit the excess glycerine to settle as a bottom layer. The excess glycerine is drawn off and the product may be further purified if desired.

Example 4

1200 pounds of glycerine are treated with 12 pounds of alkali, such as caustic soda, and the temperature is brought to 250° C. and heating continued for 4 to 5 hours, or more, between 250° and 260° C., preferably in the presence of an inert gas such as carbon dioxide or nitrogen. The resulting product of this reaction is a mixture of various polyglycerols which may be employed to produce polyglyceride products as will be shown in subsequent examples.

Example 5

100 pounds of the fatty acids of cottonseed oil are heated with agitation with 100 pounds of the reaction mixture of Example 4, for from two to three hours, at a temperature of 220° C. in the presence of an inert gas, the mixture is allowed to cool and to remain at rest, and the excess of the polyglycerol is drawn off from the product which is in the form of a supernatant layer and the product may be further purified by washing with brine or by other means. The resulting product of this reaction contains a large proportion of hydrophilic high molecular weight fatty acid esters of various polyglycerols, each containing at least one, preferably two or more, unesterified hydroxy groups.

Example 6

150 pounds of the reaction mixture of Example 5 is heated with 100 pounds of oleic acid at a temperature of about 220° C., for from two to three hours, until the free fatty acid content of the reaction mixture is reduced to ½% or 1%. The heating is done in the presence of an inert gas. The resulting product of this reaction mixture contains primarily the di-fatty acid esters of polyglycerols.

Example 7

We take 300 pounds of corn oil, and mix the same with 300 pounds of polyglycerol prepared as above, and $\tfrac{3}{16}$ of a pound of caustic soda. The mixture is heated for three hours at a temperature of approximately 260 to 265° in the absence of air. The material is allowed to settle after cooling and the excess of polyglycerol found to be present is drawn off. The resulting product is a thick, viscous oil, which, however, emulsifies very readily in water. The principal ingredients of this product are hydrophilic polyglycerol esters of the fatty acids of corn oil.

Examples of hydrophilic lipins which may be used in the present invention are as follows:
Monostearyl glycerol.
Mono-palmitic acid ester of glycerol.
Monocetyl ether of glycerol.
Monomyristyl glycerol.
Mono-lauryl glycerol.
Mono-oleyl diethylene glycol.
Mono-oleyl diglycerol.
Mono-oleyl glycerol.
1.6 di-lauryl diglycerol.
Fatty acid derivatives of sugars and sugar alcohols.
Fatty acid polyglycerides with free OH groups.

The polyglycerol esters described in Harris application, Ser. No. 697,533, filed November 10, 1933, now Patent No. 2,022,766.

The modified tri-glyceride substance described in Harris application Ser. No. 697,534, filed November 10, 1933, now Patent No. 2,009,796.

The hydroxy substances described in Harris Patent No. 1,917,257.

The characteristics of all of these examples are clear from the preceding description. They have this factor in common, in that all of them have a fatty acid radical in the molecule, with one or more OH groups which impart to the molecule as a whole, definite hydrophilic character, despite the presence of the fatty acid lipophile group, which imparts to the molecule as a whole a fatty or oily character.

All of the above described hydrophilic lipins are esters and ethers of high molecular weight lipophile radicals and water soluble polyhydroxy substances such as glycerine, polyglycerols, sugars, sugar alcohols, glycols, etc. In general, the more free hydroxy groups the substances contain in relation to the fatty acid or high molecular weight alkyl radical, the greater will be their hydrophilic properties and the less of such substances is required in the egg mixture to produce a certain result. Thus, for example, for the reaction mixture of Example 1, 7% to 10% is preferred in combination with eggs. If, however, the reaction mixture of Example 2 is used, between 25% and 30% is required to produce substantially the same results. If the reaction mixture of Example 5 is used, which contains a predominant amount of mono-fatty acid esters of polyglycerols, about 3% to 4% is sufficient in the egg mixture to produce the desired hydrophilic properties and emulsion effect, as for instance, in cake batter.

As noted hereinabove, a satisfactory way of introducing the hydrophilic material is in paste form. Hydrophilic substances which are substantially liquid at ordinary room temperatures usually disperse readily in water, or other aqueous material, such as egg whites, or take up water to form a paste. Hydrophilic substances, solid at room temperature, are emulsified with water to form paste by a convenient method in which the paste is made at an elevated temperature, at which the hydrophilic lipin is liquid, and then allowed to cool while stirring is continued. In general, we prefer to use substances which are non-solid at ordinary room temperatures. As a rule, dispersion is facilitated, and in most cases grinding is not required to facilitate dispersion.

In treating eggs, we take the egg meat out of the shell and discard all eggs which are unfit for edible purposes. 279 pounds of the eggs are introduced into a large container fitted with a mixing device, and 21 pounds of the reaction mixture of Example 1 are added with constant stirring until a homogeneous mixture is obtained.

Another example: the hydrophilic lipin may also be added by mixing first a portion of the eggs with the hydrophilic lipin in a paste and then emulsifying the rest of the egg material in the paste by constant mixing or stirring.

Another example: we can carry out the subject matter of this invention by varying the amount of whites in the egg mixture. Thus we can add more whites to the egg mixture and then add our hydrophilic lipin to it, or add more yolks, or we can separate the yolks from the whites in such a manner as to have either the whites by themselves or a mixture of yolks and whites wherein the portion of yolks is greater than the portion of whites.

Another example: for carrying out this invention in practice is to take 290 pounds of whole eggs and add to them 10 pounds of the hydrophilic lipin of Example 5, with constant stirring and agitation to produce a homogeneous mixture. The product may then be placed in cans and frozen and kept in a frozen condition until desired for use.

In using these eggs, whether in a frozen or non-frozen condition, in preparing a cake batter, they offer certain advantages in that a cake batter may be produced with a larger proportion of moisture such as milk and a correspondingly larger proportion of sugar than usually used in a cake batter (without using more egg yolk), without impairing the volume of the cake, and with a decided improvement in the tenderness and general texture characteristics of the cake. Also by virtue of the additional moisture content and of the colloidal condition of the moisture, such cake has considerably enhanced resistance to staling.

The hydrophilic lipin treated egg material has many other advantages in that when frozen and thawed it is a smooth mass with increased viscosity, with improved emulsifying value. Whether used before freezing or after freezing, in a cake batter, it makes an improved smooth cake batter; it enhances the emulsification and dispersion of the other ingredients used in the cake batter.

With the treated eggs of the above invention, it is possible to produce a more tender cake with longer keeping qualities by increasing the liquids in the formula, as well as the sugar. From 30% to 60% more liquids such as milk and eggs may be used and from 10% to 35% more sugar, than usually is used in commercial practice. It also makes possible the use of the ordinary creaming method where the ordinary shortening such as partially hydrogenated cottonseed oil, is creamed together with the sugar to incorporate a certain amount of air before the other ingredients are added.

In view of the fact that a larger proportion of sugar and liquids, such as milk and eggs, is used, it is necessary to add additional baking powder to affect the additional mass of the batter, especially when increase of liquids and sugars is very high. But this increase in baking powder is not as large as if the lipin is added to the shortening and the regular blending method is used, in which flour and shortening are first blended, then other ingredients added, the liquid constituent being added towards the end.

The usual hydrophilic lipin, introduced in a shortening such as partially hydrogenated cottonseed oil of 100 to 102° F. melting point, reduces considerably the smoking point of the shortening, and for this reason while it is suitable for baking purposes, it is not suitable for deep frying of such a product as doughnuts, and the baker usually needs two types of shortening. If, however, the hydrophilic lipin treated egg is used in baking, the ordinary hydrogenated shortening may be used, which is suitable for both baking and frying purposes.

It is not to be inferred that our invention is limited to any particular type of egg material, that is, mixed eggs, yokes and/or whites. When the egg material of our invention is used in making a conventional type of cake, ordinary whole eggs are used with good results. The invention contemplates the use of yolks substantially alone, however, or whole eggs, whites, and/or mixtures thereof, depending upon the specific use to which the product is to be put.

Generally speaking, the advantages of this invention consist not only in producing an improved egg material with specific colloidal properties, increased viscosity and better emulsifying value, but also with additional properties which affect advantageously the process of cake baking when these eggs are used in a cake batter.

We do not limit this invention to a specific method of making cake. In fact, any suitable process may be used and both additional liquids as well as additional sugar may be added without any substantial increase in baking powder to produce a cake of improved quality.

We do not limit this invention to the hydrophilic lipins enumerated above, but we intend to include all edible hydrophilic lipins containing unesterified hydroxy groups. For example, we may use a mixture of the fatty acids derived from lard and react these fatty acids with polyglycerols as given under Example 5, to produce a mixture of mono-fatty acid esters of polyglycerols containing free hydroxy groups. In place of lard, we may use partially hydrogenated cottonseed oil and react same with polyglycerols as shown in Example 5 to produce a substance containing predominantly the mono-fatty acid esters of polyglycerols with free hydroxy groups. We may also produce our lipins by reacting 100 lbs. of partially hydrogenated fat, 100 lbs. polyglycerol of Example No. 4, and 1/10 lb. sodium hydroxide at 250° C. for three hours in the presence of an inert gas, the excess polyglycerol being separated and the product washed with brine several times and dried, or it may be used in paste form. We can take these hydrophilic lipins and admix egg material with them by adding, gradually, a certain amount of egg material to form a paste, and then thinning it out with the excess of egg material and freezing it if desired. About 3 to 4% of this product is incorporated in the eggs.

In the examples given hereinabove, the relative amount of hydrophilic material varies considerably. It is to be noted, however, that materials made in accordance with the different examples given contain different amounts of free OH groups. It may be stated that the larger the number of free OH groups present in the hydrophilic lipin, the greater will be its hydrophilic value. In substituting one compound for another, the number of free OH groups may be taken as a guide or index of the amount of that material to be used. Factors other than the number of free hydroxy groups enter, however, which modify the ultimate product; these factors being for example molecular weight, type and amount of lipophile groups present. What ever the character of lipophile group or groups may be, all hydrophilic lipins with free hydroxy groups will have an effect in modifying the colloidal character, interface modification, etc., of the final egg product.

Beside the hydrophilic lipin, we may also add other modifying agents which have been used heretofore, such as, in the case of mixed eggs, for example, we may add a small proportion of salt, about 1/4% to 1%, or we may add cane sugar, dextrose or glycerine, and we may further modify our egg mixture by adding small proportions of edible acids such as tartaric or citric acids, about 1/16%. The addition of these agents to the egg mixture containing the hydrophilic lipin further modifies the composition to produce a product which further modifies the colloidal properties of the egg mixture to produce a product which does not resemble, either in physical consistency nor in colloidal properties, an egg product treated with hydrophilic lipins by themselves, nor with the addition agents by themselves. Larger proportions of salt and sugar may be added to the egg material, whether yolks, whites, or mixed yolks and whites.

If, for example, liquid whole eggs are treated with about 4% of polyglycerides of Example 5, they may be preserved without freezing by adding a sufficient amount of glycerine, ethyleneglycol, polyglycerols, or polyglycols, or similar compatible substances to prevent spoilage of the mixture at ordinary temperatures. The composition of this character has specific characteristics of its own.

The hydrophilic lipin egg product which may be either egg whites, yolks, whole eggs, or egg material containing varying amounts of egg yolks without the preserving ingredients mentioned, may be preserved for long periods until ready for use by freezing at low temperatures, such as temperatures usually maintained in commercial cold storage warehouses for freezing eggs and keeping them below temperatures of decomposition. Such temperatures are, for example, from about +5 to —10° F., depending on the nature of the egg product. When ready for use, the product is thawed out.

As previously noted, the product of this invention may be used in many foods, such as cake batters, where fatty constituents such as animal or vegetable oil are used in aqueous dispersion. The colloidal properties of our treated egg material, however, make it suitable for many other technical purposes where emulsification is important. Thus it may be used as a base to emulsify oil, fats, sulphonated oils, etc., used in the leather industry and many other industries. The product may also be used in cosmetics in combination with olive oil and sulphonated oil, for example, together with antiseptics and other usual ingredients.

Our present application is a division of our prior application Serial No. 706,292, filed January 11, 1934, now Patent No. 2,026,631, issued January 7, 1936.

What we claim as new and desire to protect by Letters Patent of the United States is:

1. A composition consisting essentially of egg material and a proportion of a hydrophilic lipin, said hydrophilic lipin comprising a derivative of a polyhydroxy substance having a relatively high molecular weight lipophile group and at least one unesterified hydroxy group derived from the polyhydroxy substance.

2. A composition consisting essentially of egg whites and a proportion of a hydrophilic lipin, said hydrophilic lipin comprising a derivative of a polyhydroxy substance having a relatively high molecular weight lipophile group and at least one unesterified hydroxy group derived from the polyhydroxy substance.

3. A composition consisting essentially of egg yolks and a proportion of a hydrophilic lipin, said hydrophilic lipin comprising a derivative of a polyhydroxy substance having a relatively high molecular weight lipophile group and at least one unesterified hydroxy group derived from the polyhydroxy susbtance.

4. A composition consisting essentially of egg material and a proportion of a hydrophilic higher fatty acid ester of a polyhydroxy substance wherein said ester has at least one unesterified hydroxy group in the polyhydric nucleus.

5. A composition consisting essentially of egg whites and a proportion of a hydrophilic higher fatty acid ester of a polyhydroxy substance wherein said ester has at least one unesterified hydroxy group in the polyhydric nucleus.

6. A composition consisting essentially of egg yolks and a proportion of a hydrophilic higher fatty acid ester of a polyhydroxy substance wherein said ester has at least one unesterified hydroxy group in the polyhydric nucleus.

7. A composition consisting essentially of egg material and a proportion of a hydrophilic lipin, said hydrophilic lipin comprising a mono-derivative of a glycol having a relatively high molecular weight lipophile group and a hydroxy group forming a part of the glycol nucleus.

8. A composition consisting essentially of egg material and a proportion of a hydrophilic lipin, said hydrophilic lipin comprising a derivative of a polyhydroxy substance of a class consisting of sugars and sugar alcohols, said derivatives having at least one relatively high molecular weight lipophile group and at least one hydroxy group derived from the polyhydroxy substance.

9. A composition consisting essentially of egg material and a proportion of a hydrophilic lipin, said hydrophilic lipin being a relatively high molecular weight fatty acid ester of a polyhydroxy substance of a class consisting of glycols, sugars, and sugar alcohols, and said ester having at least one unesterified hydroxy group derived from the polyhydroxy substance.

10. A frozen egg product consisting essentially of egg material and a proportion of a hydrophilic lipin, said hydrophilic lipin comprising a derivative of a polyhydroxy substance having a relatively high molecular weight lipophile group and at least one unesterified hydroxy group derived from the polyhydroxy substance, said product being frozen and maintained in a frozen condition until ready for use.

11. A frozen egg product consisting essentially of egg whites and a proportion of a hydrophilic lipin, said hydrophilic lipin comprising a derivative of a polyhydroxy substance having a relatively high molecular weight lipophile group and at least one unesterified hydroxy group derived from the polyhydroxy substance, said product being frozen and maintained in a frozen condition until ready for use.

12. A frozen egg product consisting essentially of egg yolks and a proportion of a hydrophilic lipin, said hydrophilic lipin comprising a derivative of a polyhydroxy substance having a relatively high molecular weight lipophile group and at least one unesterified hydroxy group derived from the polyhydroxy substance, said product being frozen and maintained in a frozen condition until ready for use.

13. A frozen egg product consisting essentially of egg material and a proportion of a hydrophilic higher fatty acid ester of a polyhydroxy substance wherein said ester has at least one unesterified hydroxy group in the polyhydric nucleus, said product being frozen and maintained in a frozen condition until ready for use.

14. A frozen egg product consisting essentially of egg whites and a proportion of a hydrophilic higher fatty acid ester of a polyhydroxy substance wherein said ester has at least one unesterified hydroxy group in the polyhydric nucleus, said product being frozen and maintained in a frozen condition until ready for use.

15. A frozen egg product consisting essentially of egg yolks and a proportion of a hydrophilic higher fatty acid ester of a polyhydroxy substance wherein said ester has at least one unesterified hydroxy group in the polyhydric nucleus, said product being frozen and maintained in a frozen condition until ready for use.

16. A frozen egg product consisting essentially of egg material and a proportion of a hydrophilic lipin, said hydrophilic lipin comprising a mono-derivative of a glycol having a relatively high molecular weight lipophile group and a hydroxy group forming a part of the glycol nucleus, said product being frozen and maintained in a frozen condition until ready for use.

17. A frozen egg product consisting essentially of egg material and a proportion of a hydrophilic lipin, said hydrophilic lipin comprising a derivative of a polyhydroxy substance of a class consisting of sugars and sugar alcohols, said derivatives having at least one relatively high molecular weight lipophile group and at least one hydroxy group derived from the polyhydroxy substance, said product being frozen and maintained in a frozen condition until ready for use.

18. A frozen egg product consisting essentially of egg material and a proportion of a hydrophilic lipin, said hydrophilic lipin being a relatively high molecular weight fatty acid ester of a polyhydroxy substance of a class consisting of glycols, sugars and sugar alcohols, said ester having at least one unesterified hydroxy group derived from the polyhydroxy substance, and said product being frozen and maintained in a frozen condition until ready for use.

BENJAMIN R. HARRIS.
MARVIN C. REYNOLDS.